(12) United States Patent
Naruse et al.

(10) Patent No.: US 6,219,399 B1
(45) Date of Patent: Apr. 17, 2001

(54) MAINTENANCE METHOD IN NUCLEAR POWER PLANT

(75) Inventors: Yoshihiro Naruse; Shinichi Hoshino, both of Yokohama (JP)

(73) Assignees: Kabushiki Kaisha Toshiba; Toshiba Engineering Corporation, both of Kawasaki (JP)

( * ) Notice: Subject to any disclaimer, the term of this patent is extended or adjusted under 35 U.S.C. 154(b) by 0 days.

(21) Appl. No.: 09/317,916

(22) Filed: May 25, 1999

(51) Int. Cl.⁷ .................... G21C 17/00; G21C 19/32
(52) U.S. Cl. .................. 376/245; 376/249; 376/308; 376/313
(58) Field of Search .................... 376/245, 249, 376/313, 308, 310

(56) References Cited

U.S. PATENT DOCUMENTS

| 4,374,024 | * | 2/1983 | Peloquin et al. ............... 210/241 |
| 4,661,220 | * | 4/1987 | Fejes et al. .................. 204/141.5 |
| 4,959,146 | * | 9/1990 | Kristan ....................... 210/237 |

FOREIGN PATENT DOCUMENTS

| 2551250 | * | 8/1983 | (FR) . |
| 0053883 | * | 3/1985 | (JP) . |
| 0082899 | * | 5/1985 | (JP) . |
| 403255394 | * | 11/1991 | (JP) . |
| 404212096 | * | 8/1992 | (JP) . |
| 405188179 | * | 7/1993 | (JP) . |
| 6-94885 |   | 4/1994 | (JP) . |
| 406273576 | * | 9/1994 | (JP) . |

\* cited by examiner

Primary Examiner—Michael J. Carone
Assistant Examiner—K. Kevin Mun
(74) Attorney, Agent, or Firm—Finnegan, Henderson, Farabow, Garrett, & Dunner, L.L.P.

(57) ABSTRACT

A maintenance of a suppression pool or spent fuel storage pool in a reactor primary containment vessel of a nuclear power plant includes a cleaning step of a water in the suppression pool and a decontamination step of an interior of the suppression pool, and in the maintenance, the coated film applied on an inner surface of a wall portion of the suppression pool is inspected. These cleaning, decontaminating and inspecting steps are performed by divers while maintaining a water level in the suppression pool.

22 Claims, 12 Drawing Sheets

MAINTENANCE METHOD IN NUCLEAR POWER PLANT

BACKGROUND OF THE INVENTION

The present invention relates to a maintenance method in a nuclear power plant, and more particularly, to a maintenance method for maintaining a suppression chamber and a spent fuel storage pool provided in a nuclear reactor building in a nuclear power plant.

The reactor building of a nuclear power plant is provided with a reactor primary containment vessel (called containment vessel hereinlater) to enclose radioactive materials leaking from a reactor core within a nuclear reactor primary system and to prevent leakage of radiation in the event of a reactor failure accident in the primary system.

All of the containment vessels provided in boiling-water reactors (BWR), including advanced boiling-water reactors (ABWR), are pressure-suppression type vessels, which are generally constructed to be provided with a dry well and a suppression chamber.

FIG. 10 is a schematic cross-sectional view showing one example of such a containment vessel in the boiling-water reactor mentioned above. A primary containment vessel 1 is provided with a dry well 2 and a suppression chamber 3, and a reactor pressure vessel 5 is arranged at the central portion of the interior of the dry well 2 and supported by a reactor pressure vessel pedestal 4. A suppression pool 6 is provided in the suppression chamber 3 and is always filled with water.

The dry well 2 and the suppression chamber 3 communicate with each other through a vent pipe 7. The vent pipe 7 is connected to a downcomer 8 within the suppression chamber 3. The downcomer 8 is opened at a tip end portion to the water of the suppression pool 6.

FIG. 11 is a schematic cross-sectional view showing a primary containment vessel in a boiling-water reactor different in type from that of FIG. 10. As in the case of FIG. 10, the containment vessel of FIG. 11 is provided with a dry well 2 and a suppression chamber 3. A reactor pressure vessel 5 is provided at the central portion of the interior of the dry well 2 and is supported by a reactor pressure vessel pedestal 4. A suppression pool 6 is provided in the suppression chamber 3 and is always filled with water.

The dry well 2 and the suppression chamber 3 communicate with each other through a vent pipe 7. The vent pipe 7 has openings at forked tip end portions into the water of the suppression pool 6 in the suppression chamber 3.

The suppression chambers 3 shown in FIGS. 10 and 11 are formed by using steel plates. Since the steel plate does not have a corrosion allowance, the surface thereof is coated in viewpoints of corrosion resistance, water resistance and decontamination. Therefore, on the basis of the idea of preventive maintenance that the suppression chamber 3 is repaired before the life of a coated film applied onto the steel plate of the suppression chamber is over, the coated film of the suppression chamber 3 must be repaired almost at ten years intervals.

In the case of performing such repair coating operation, the state of the coated film on the inner surface of a suppression pool wall 6a is conventionally inspected throughout the pool by using a remote-controlled underwater camera or the like provided within the suppression chamber 3 in advance. Based on the inspection result, re-coating timing and re-coating areas must be determined. In the re-coating operation, first, the suppression chamber 3 is drained off, and the suppression pool 6 is made vacant by draining off the chamber 3.

In this state, although the re-coating operation is conducted. In the air, unlike in the water, radiation shielding effect is reduced or lost. For this reason, it is required to carry out the decontamination for removing radioactive materials present in the suppression chamber 3 before the re-coating operation. Since the radioactive materials involve substances or matters floating in the water of the suppression pool or those deposited on the bottom thereof which exist as residues or sludges, the inner surface of the suppression pool wall 6a is washed or the floating substances and/or sludges are removed through the remote control operation as the decontamination operation.

After the decontamination is over, a scaffold is mounted, operators go downs along the suppression chamber wall 6a through the scaffold, carries out substrate treatment for the target coated film to be repaired and then starts re-coating.

After all of the repair target surfaces are re-coated, the scaffold is dismounted and the suppression pool is filled up with water again, thereby completing the operation.

Further, as shown in FIG. 12, a spent fuel storage pool 10 is provided in the nuclear reactor building 9 for storing the spent fuel, which was burnt in the reactor of the containment vessel 1 and which life has expired. Since the interior of the spent fuel storage pool 10 is normally lined with a stainless steel, it is not necessary to apply coating. However, in view of the deterioration of the lining and a generation of other various deposits, an internal inspection is desired. Conventionally, when inspecting and decontaminating the spent fuel storage pool 10, the pool is drained off.

However, it takes considerable workload, time and cost to drain off the suppression chamber 3 and the spent fuel storage pool 10 and to perform decontamination following the above-stated internal inspection and repair coating operation. Further, if the decontamination operation is performed while the suppression chamber 3 and the spent fuel storage pool 10 are being drained off, i.e., in the air, it requires more operators due to the fact that radiation dose in the air becomes larger than that in the water, which also requires far more facility, considerable labor, time and cost.

Moreover, if the repair coating operation is conducted for the local deterioration of the coated film within the suppression chamber 3, it is required to entirely drain off the suppression pool 6. It takes, therefore, considerable workload, time and cost to perform such a local repair.

SUMMARY OF THE INVENTION

An object of the present invention is to almost eliminate defects or drawbacks encountered in the prior art mentioned above and to provide a maintenance method in a nuclear power plant capable of eliminating much workload, working time, cost and the like which have been conventionally required for the maintenance of a suppression pool and a spent fuel storage pool of a nuclear power plant due to the necessity for draining off the pools and capable of performing the repairing operation relatively easily for a short time and at low cost.

This and other objects can be achieved according to the present invention by providing, in one aspect, a maintenance method in a nuclear power plant including a reactor primary containment vessel provided with a suppression pool of a suppression chamber, comprising the steps of:

improving clearness of a water in the suppression pool and decontaminating an interior of the suppression pool; and inspecting a coated film applied on an inner surface of a wall portion of the suppression pool, wherein the improving, decontaminating and inspecting steps are performed while maintaining a water level in the suppression pool.

In preferred embodiments, a repair coating is further carried out to the coated film -through the underwater operation in the suppression pool after inspecting the coated film applied on the inner surface of the suppression pool wall.

The clearness and the decontamination of the water in the suppression pool are performed by collecting substances or matters floating in the water of the suppression pool, such as chalk river unclassified deposit or substance, and removing and collecting substances deposited as sludges on an inner bottom surface of the suppression pool wall. The substances floating in the water of the suppression pool is sucked up together with the surrounding water out of the suppression pool by suction means movable in or above the water. The floating substances and the surrounding water sucked up in the suppression pool are subjected to solid-liquid separation on an outside the suppression pool.

The suction means includes a rotating brush and a suction port arranged around the rotating brush so as to suck up the substances deposited as sludges on the inner bottom surface of the suppression pool together with the surrounding water therein.

The decontamination of the interior of the suppression pool includes removing of sludges and/or deteriorated substances on the inner surface of the suppression pool wall. The sludges and/or deteriorated substances, called hereunder merely as sludge or sludges, on the inner surface of the suppression pool wall are removed through a sucking step by using a suction means comprising a rotating brush and a suction port arranged around the rotating brush so as to suck up the sludges together with the surrounding water in the suppression pool. The sludges and the surrounding water sucked up in the suppression pool are subjected to solid-liquid separation on an outside the suppression pool.

The inspecting step of the coated film applied on the inner surface of the suppression pool wall is performed by visually observing an surface condition of the coated film by using an underwater camera, which may include at least one of a fixed camera disposed in the suppression chamber and a camera movable in the water of the suppression pool. The underwater camera may include a fixed camera disposed in the suppression chamber and a camera movable in the water of the suppression pool, the fixed camera being used to set a general inspection position in the suppression pool and the movable camera including a first movable camera used to set a fine position approaching the inspection point and a second movable camera used to observe a state of the coated film while approaching the inspection position more closely than the first movable camera. An information obtained by the underwater camera is displayed on a monitor television disposed outside the suppression pool to thereby allow observation in the air.

A repair coating is carried out to the coated film through the underwater operation in the suppression pool after inspecting the coated film applied on the inner surface of the suppression pool wall. The repair coating step to the coated film on the inner surface of the suppression pool wall is carried out by peeling off a deteriorated or deformed coated film at a portion to be repaired by using one of a disc sander and a grinder provided with a suction means and a substrate treatment is carried out by sucking up the surrounding water out of the suppression pool. The repair coating step of the coated film on the inner surface of the suppression pool wall is carried out by applying an underwater coating to the inner surface of the suppression pool wall by using one of a brush having suction means arranged around the brush, a roller and other coating means and a coating splashed during the underwater coating applying step is sucked up outside the suppression pool together with the surrounding water.

The maintenance method may further include the step of measuring a thickness of the coated film on the inner surface of the suppression pool wall by using a film thickness measuring device in the suppression pool. The maintenance method may further include the step of preparing an underwater plate thickness measuring device into the suppression pool and measuring a plate thickness of a plate constituting the suppression pool wall by using the plate thickness measuring device. The maintenance method may further include the steps of closing a strainer provided on the inner surface of the suppression pool wall in an underwater operation and inspecting a valve of a piping communicating with the outside of the suppression pool through the strainer. The maintenance method may further include the step of welding defect portions and portions to be repaired of the suppression poll wall, inner structure of the suppression pool, ducts, machineries and duct supports in an underwater operation in the suppression pool, and the welded portions are subjected to a nondestructive test in an underwater operation.

The maintenance method may further include the step of carrying out a cutting working for repairing an inner structure of the suppression pool, ducts, machineries and duct supports in an underwater operation in the suppression pool.

In another aspect of the present invention, there is provided a maintenance method in a nuclear power plant including a reactor primary containment vessel provided with a spent fuel storage pool, comprising the steps of:

improving clearness of a water in the spent fuel storage pool and decontaminating an interior of the spent fuel storage pool;

inspecting a surface condition of an inner surface of a wall portion of the spent fuel storage pool, wherein the improving, decontaminating and inspecting steps are performed while maintaining a water level in the spent fuel storage pool.

In this aspect, preferred embodiments similar to those mentioned above with respect to the maintenance method performed in the suppression pool water will be applicable.

According to the present invention of the aspects mentioned above, the maintenance workings such as cleaning, decontaminating, inspecting workings to the inner wall surface of the suppression pool and the spent fuel storage pool in the reactor primary containment vessel can be carried out in the underwater therein without draining off the pools. Such draining working involves much labour, time and cost as in the conventional maintenance method.

The maintenance method according to the present invention can be easily performed for short time and with low cost.

The nature and further characteristic features of the present invention will be made more clear from the following descriptions made with reference to the accompanying drawings.

DESCRIPTION OF THE PREFERRED EMBODIMENTS

Figure 9:
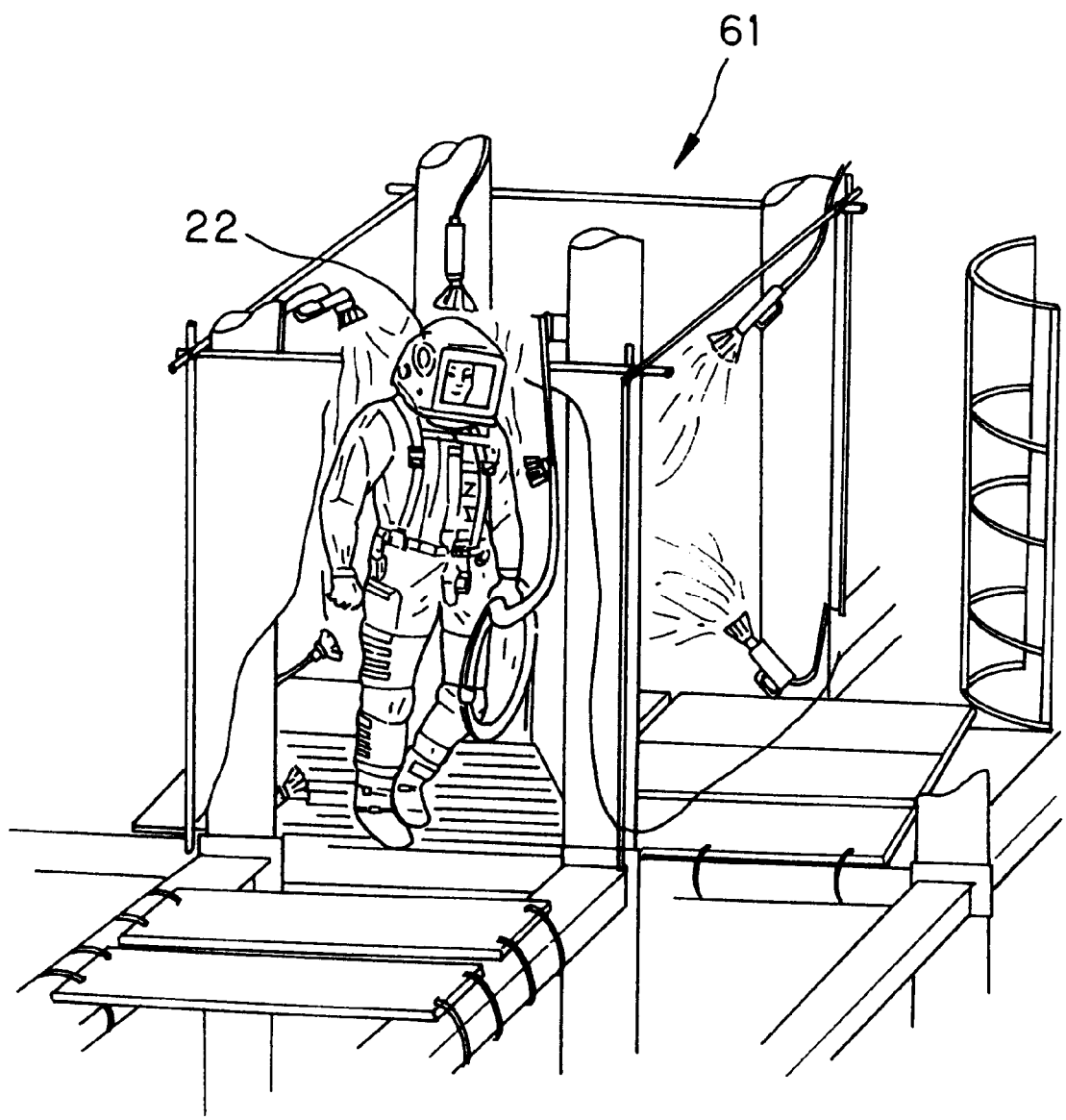
FIG. 9 is a view for explaining the decontamination by a diver worked in the suppression chamber.
Figure 10:
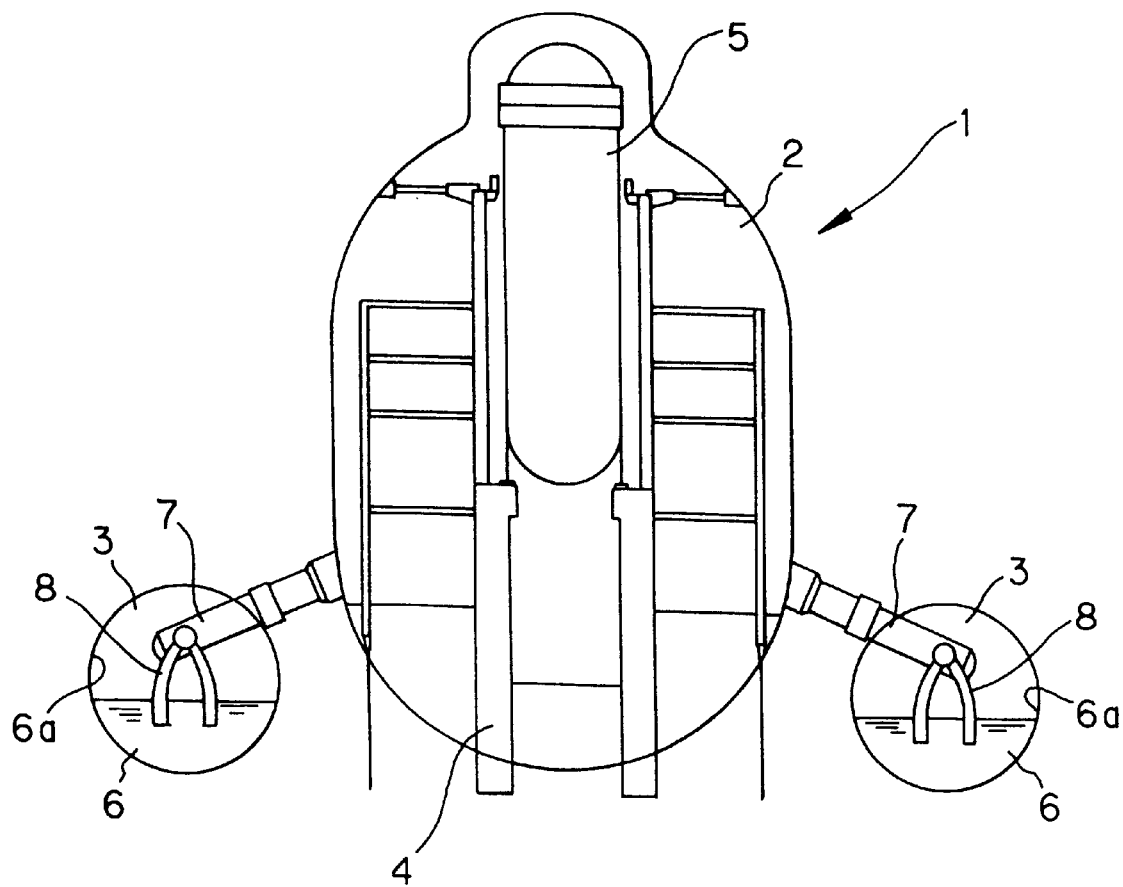
FIG. 10 is a schematic sectional view of a containment vessel in a boiling-water reactor.
Figure 11:
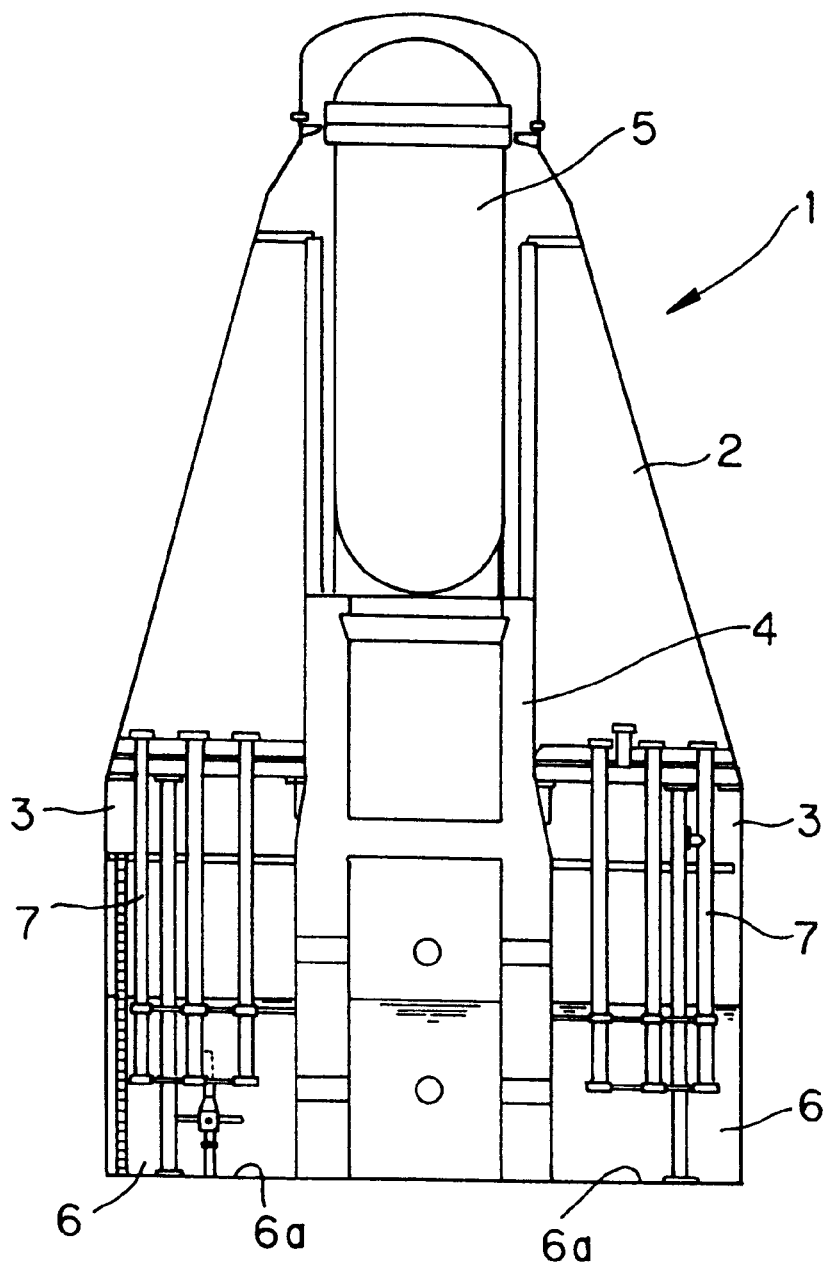
FIG. 11 is a schematic sectional view of another type containment vessel in a boiling-water reactor.
Figure 12:
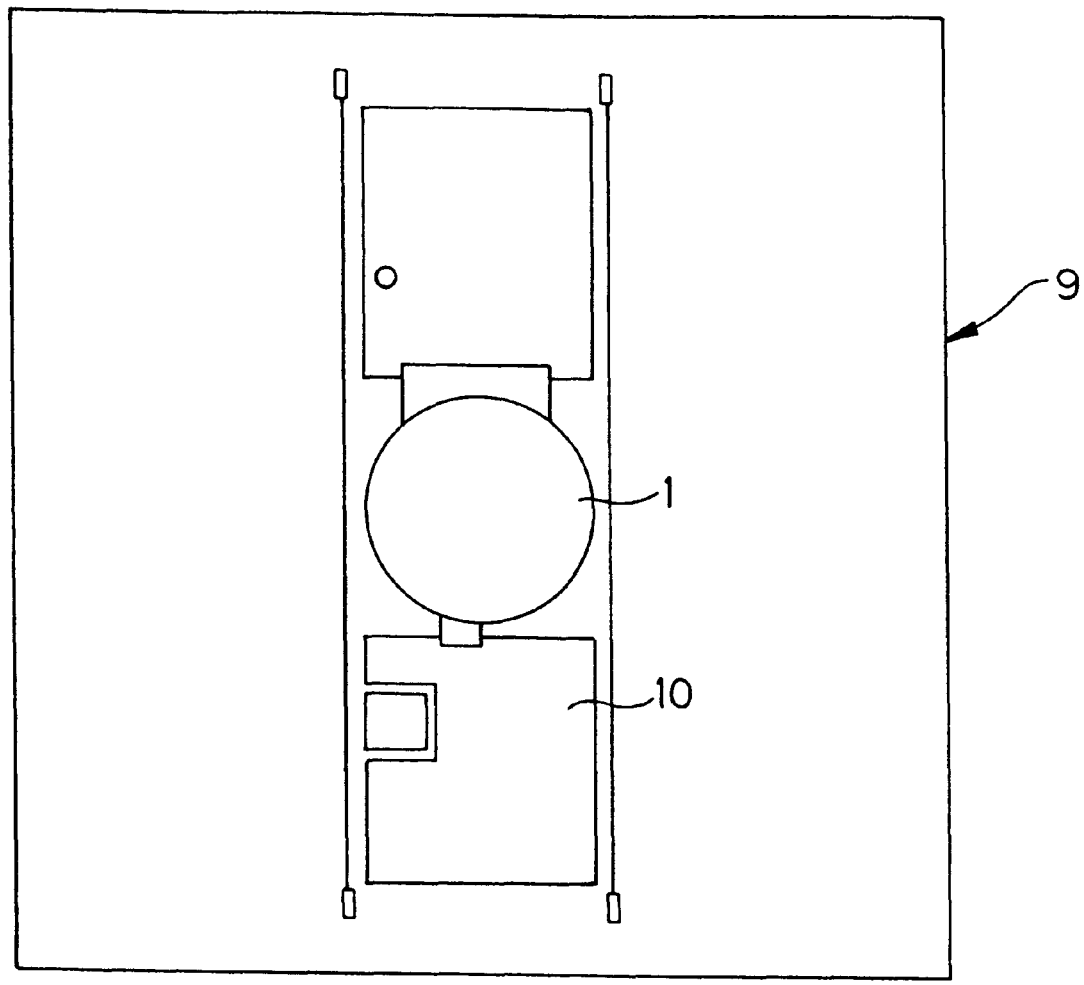
FIG. 12 is a plan view of a nuclear reactor building in the boiling-water reactor.

A maintenance method in a nuclear power plant according to the present invention will be described hereunder by way of one preferred embodiment with reference to FIGS. 1 through 9, and it is to be noted that FIGS. 10 through 12 are referred to for a reactor primary containment vessel and the like applied in the following embodiment.

Figure 1:
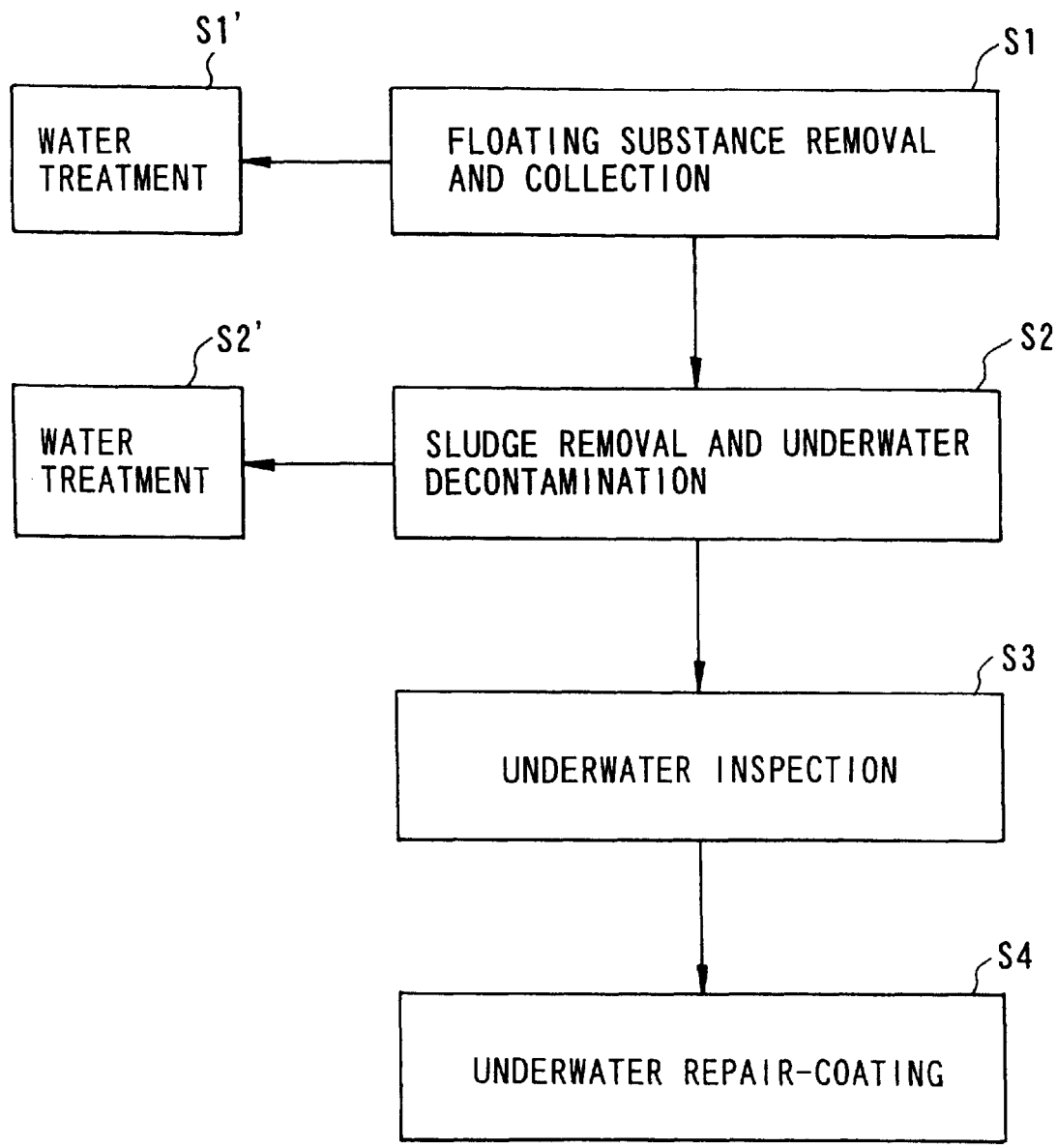
FIG. 1 is a flowchart for schematically showing one embodiment of a maintenance method in a nuclear power plant according to the present invention.

FIG. 1 is a flowchart schematically showing a maintenance method in a nuclear power plant in this embodiment.

As shown in FIG. 1, substances or matters floating in the water of a suppression pool 6, which are typically referred to in this art field as chalk river unclassified deposit or substance, are collected together with surrounding water so as to purify the water of the pool 6 and improve water clearness (in a step S1).

When the water of the pool 6 is purified and clear enough, a diver or divers (workers) start an underwater operation or working. The underwater maintenance conducted by the divers is to collect the substances deposited on the inner bottom surface of a suppression pool wall as sludge, to decontaminate the inner surface of the suppression pool wall in the water and to clean the inner surface of the suppression pool wall (in a step S2). Further, it is to be noted that, in the disclosure of the present specification, floating substance such as chalk river unclassified deposit or substance and substance deposited on the inner bottom surface of the suppression pool are treated hereto be collected and removed, but in this specification, hereunder, these floating substances and deposited sludges may be handled as substances inclusively. Both the substances, i.e. floating substance and sludgesubstance, and contaminants are collected (recovered or removed) together with the surrounding water.

The substances together with the surrounding water which have been collected and recovered in the operations of the steps S1 and S2 are separated into solid part and liquid part (solid-liquid separation) by means of water treatments (steps S1' and S2'), respectively.

In a case where the inner surface of the suppression pool wall 6a is cleaned, a coating film applied on the inner surface of the suppression pool wall 6a is inspected underwater (in a step S3), and in this step, when a portion at which the coated film is discovered to become defective, it is repaired and coated through the underwater operation or working (in a step S4).

The maintenance method in a nuclear power plant according to this embodiment will be described in detail hereunder.

Figure 2:
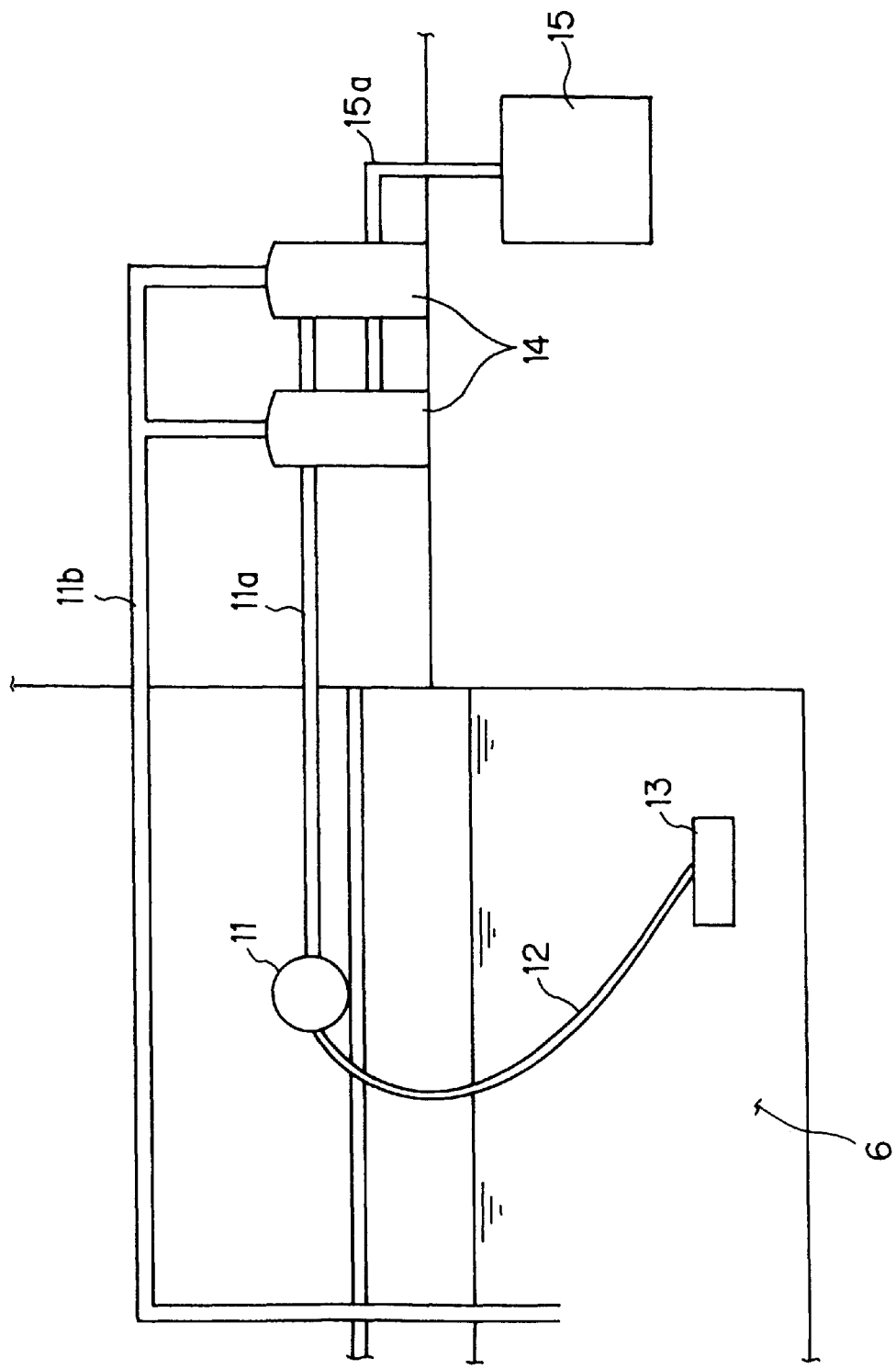
FIG. 2 is a view for explaining a state of collecting floating substances within a suppression pool of the nuclear power plant in this embodiment.

FIG. 2 is a schematic view for explaining the operation for collecting the floating substances in the water of the suppression pool 6 (the step S1) and the water treatment for the collecting operation (step S1').

As shown in FIG. 2, the floating substances are collected by using a suction pump 11 disposed above the suppression pool 6 and a suction member 13 connected to the suction pump 11 through a flexible hose 12 and movable in the water of the suppression pool 6. The suction member 13 is hung from the upper place into the water by using, for example, a crane, and sucks up the floating foreign matters together with the surrounding water. A water treatment apparatus 14 and a substance collecting tank 15 provided outside the pool are connected to the suction pump 11 through a collecting piping 11a. The water treatment apparatus 14 carries out the solid-liquid separation to the foreign matters and surrounding water. The substances are collected in the substance collecting tank 15 through a discharge piping 15a, whereas purified water is returned to the suppression pool 6 through a return piping 11b. Through such operation, the water of the pool can be purified and the clearness thereof can be improved.

Figure 3:
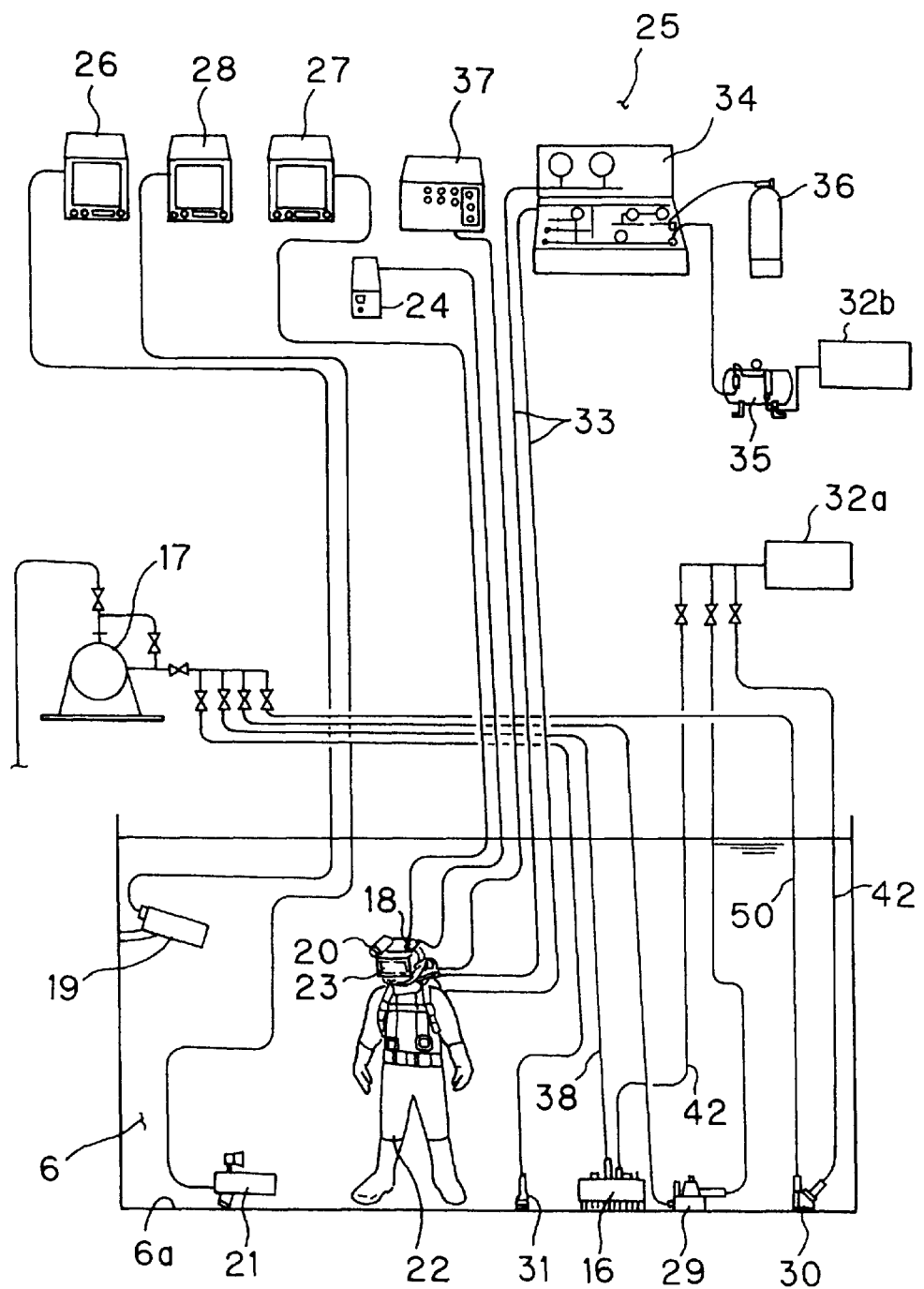
FIG. 3 shows various maintenance apparatus used in the present invention.

FIG. 3 is an explanatory view showing various maintenance apparatus used for the underwater maintenance in the steps S2 to S4.

In case of collecting the substances deposited as sludge on the inner bottom surface of the suppression pool 6 and decontaminating the inner surface of the suppression pool wall 6a (in step S2), a rotating brush 16 is used. As will be described later in detail, the rotating brush 16 is designed so as to suck up surrounding water and is connected to the suction pump 17 disposed outside the pool. By means of the sucking action of the suction pump 17, the sludges on the inner bottom surface of the suppression pool 6, deposits and deteriorated matters on the inner surface of the suction pool wall 6a are sucked up together with the surrounding water therein.

In the case of the underwater inspection of a coated film applied on the inner surface of the suppression pool wall 6a (in a step S3), an underwater light 18, a fixed camera 19, the first movable camera 20 and the second movable camera 21 are used.

The underwater light 18 is attached to a helmet 23 of a diver 22 and can be switched on and off by an underwater light switch 24. By switching on the underwater light 18, light can be shed on inspection target portions.

The fixed camera 19 is swingably disposed in a suppression chamber 3 and used to determine general inspection positions within the suppression pool 6. The fixed camera 19 is connected to a TV monitor 26 provided in an air part 25 (which is filled up with an air). The TV monitor 26 allows for operators to observe images from the fixed camera 19 in the air part 25.

The first movable camera 20, for determining fine positions close to the inspection portions, is installed on the helmet 23 of the diver 22. The first movable camera 20 is connected to a TV monitor 27 in the air part 25 so as to observe the coated film in the air part 25.

The second movable camera 21 is manually operated and carried underwater by the diver 22. The second movable camera 21 is used to observe the state of the coating film while approaching the inspection positions more closely than the first movable camera 20. The second movable camera 21 is connected to a TV monitor 28 to allow the operators to observe the state of the coated film in the air part 25.

Underwater repair coating operation is conducted to the position which is discovered to be necessary to repair as a result of the underwater inspection (in a step S4).

In the underwater repair coating operation, the substrate treatment for coating a portion to be repaired is first performed. In the substrate treatment, deteriorated coated film or coating or the like is ground by using either a disc sander 29 or a grinder 30 or using both of them. The disc sander 29 and the grinder 30 are designed to suck up surrounding water (as will be described later typically for the grinder 30 with reference to FIG. 6) and connected to the suction pump 17 mentioned above. With this arrangement, the substrate treatment is conducted while sucking up the deteriorated coated or coating pieces or the like together with the surrounding water out of the pool.

After the substrate treatment for the repair position has been completed, the underwater coating is applied on the repair surface as underwater coating repair operation. In the coating operation, a brush 31 is used, for example. The brush 31 is designed to be capable of sucking up the surrounding water and connected to the suction pump 17. If the underwater coating is applied by means of the suction pump 17, the coating splashing in the water is sucked together with the surrounding water to thereby prevent the contamination of the water of the pool.

The above-mentioned rotating brush 16, disc sander 29 and grinder 30 used in the underwater decontamination and underwater repair coating are driven by an air motor and rotated by means of air pressure supplied from a predetermined air system 32a.

The diver 22 is supplied with air from an air feeding unit 34, an air storage tank 35 and a predetermined air system 32b through, for example, an air hose 33. A backup air cylinder 36 is connected to the air feeding unit 34 for use in emergency. An underwater portable cylinder may be used.

In addition, the diver 22 can communicate with an operator in the air part 25 by a communication system 37.

The operating steps S2 to S4 will be described hereunder in more detail.

Figure 4:
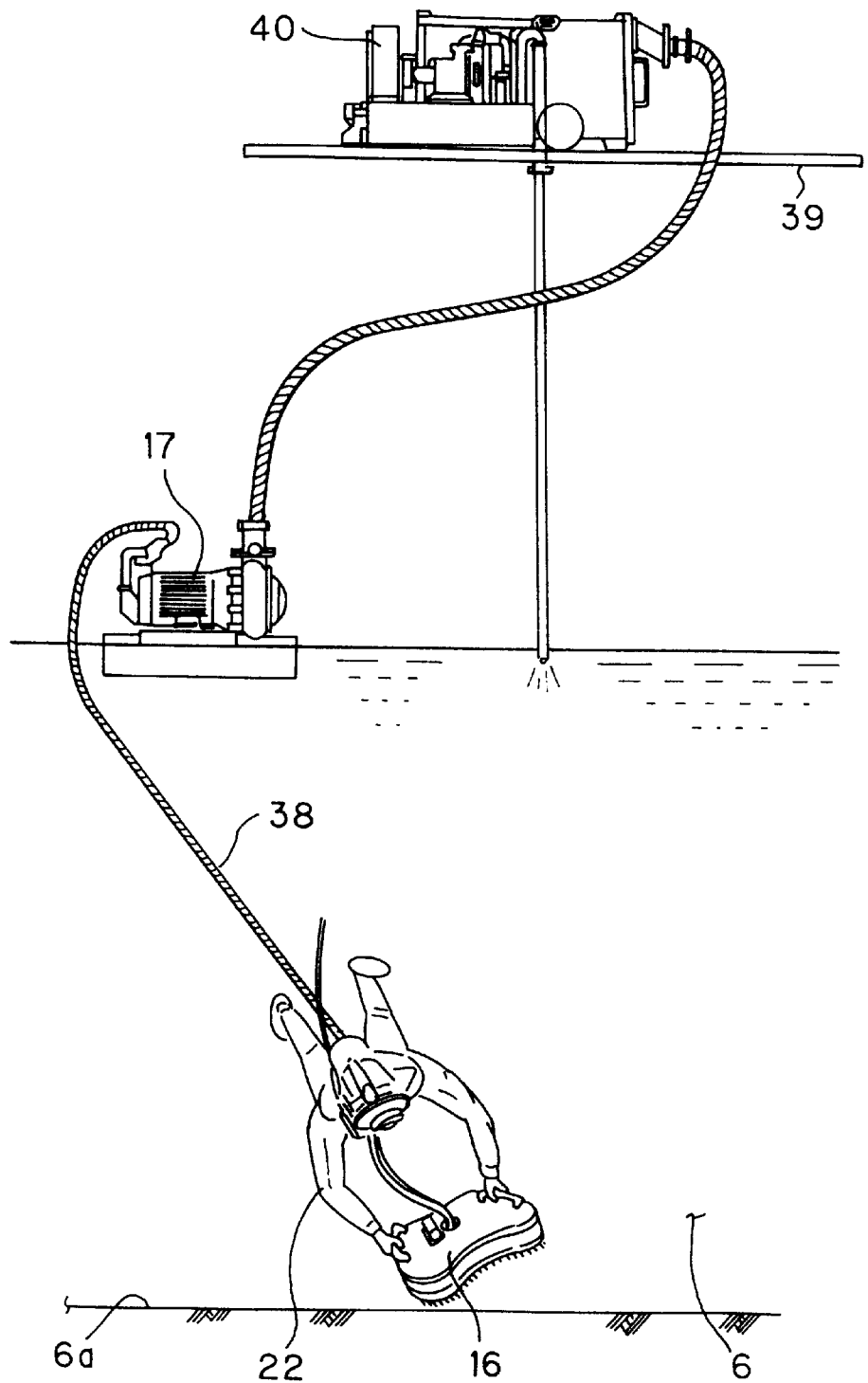
FIG. 4 is a view for explaining decontamination operation, using a rotating brush, in this embodiment.

FIG. 4 concretely shows a state in which the diver 22 removes and collects the sludges deposited on the inner bottom surface of the suppression pool 6.

As shown in FIG. 4, the diver 22 dives into the suppression pool 6 with the rotating brush 16 being rotated. Since the rotating brush 16 is connected to the suction pump 17 provided above the water of the suppression pool 6 through a flexible vacuum hose 38, the brush 16 is freely movable in the water. The suction pump 17, which is connected to a water treatment apparatus 40 provided on a platform 39, sucks up the sludges on the inner bottom surface of the suppression pool 6 together with the surrounding water. The collected substances and the surrounding water are subjected to the solid-liquid separation in the water treatment apparatus 40. The purified water is returned to the suppression pool 6, and the substances are collected in a substance collecting tank which is not shown.

Figure 5:
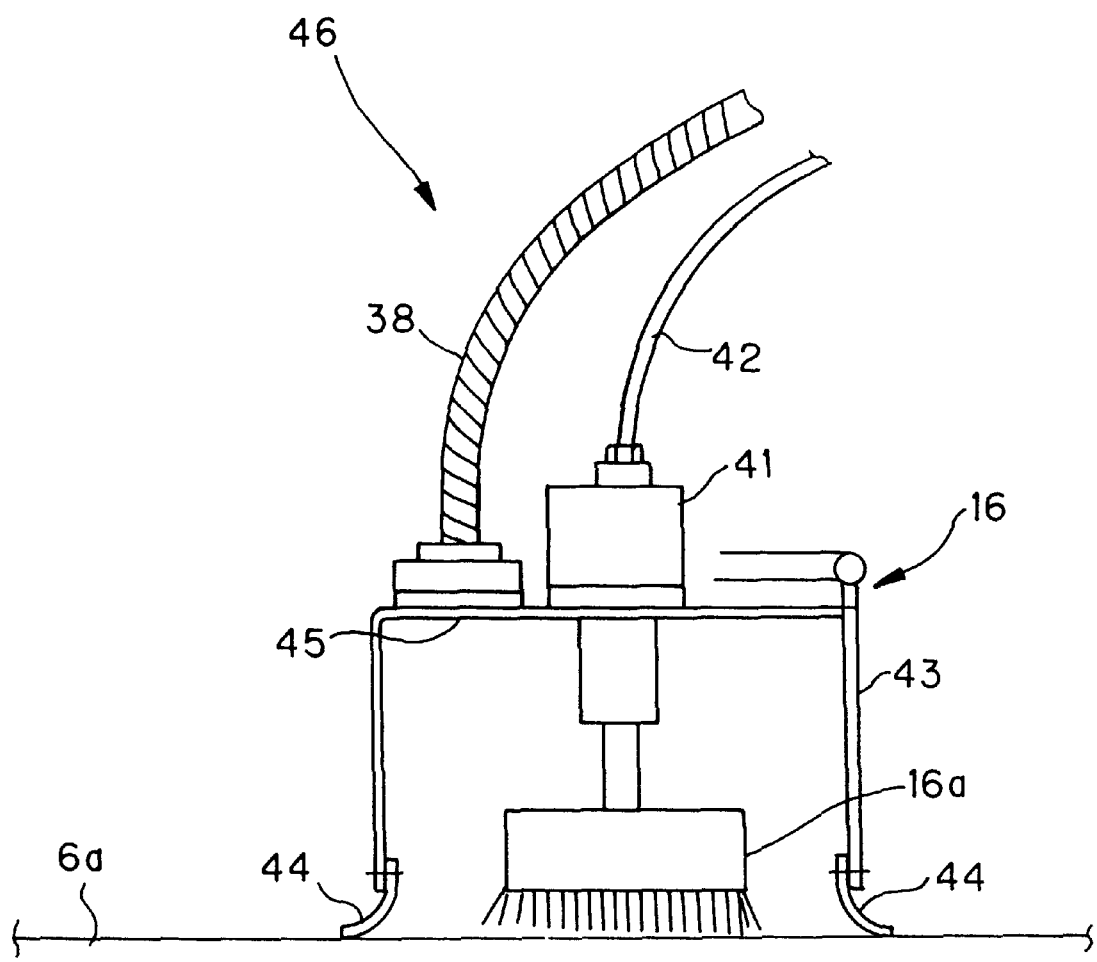
FIG. 5 is a schematic sectional view showing a rotating brush in an enlarged scale used for the present invention.

FIG. 5 is a cross-sectional view showing the rotating brush 16 in an enlarged scale. The rotating brush 16 includes a rotating brush main body 16a driven by an air motor 41.

The rotating brush main body 16a is surrounded by a shield cover 43 and a shield brush 44. The air motor 41 is connected to the predetermined air system 32a through an air hose 42 as shown in FIG. 3. If the air motor 41 is driven by air supplied from the predetermined air system 32a, the rotating brush main body 16a rotates. According to the rotation of the rotating brush main body 16a, the sludges on the inner bottom surface of the suppression pool 6 can be peeled off.

Further, the shield cover 43, which is connected to the suction pump 17 shown in FIG. 3 through the vacuum hose 38, sucks up the water surrounding the rotating brush main body 16a from the suction port 45 of the vacuum hose 38. That is, the shield cover 43, the shield brush 44, the vacuum hose 38 and the suction pump 17 serve as suction means 46 as a whole. The sludges peeled off by the rotation of the rotating brush main body 16a are diffused into the water once. However, the suction means 46 sucks up the floating substances and/or sludges together with the surrounding water, and accordingly, it becomes possible to remove and collect the sludges and to decontaminate the inner surface of the suppression pool wall 6a without diffusing the substances or sludges and deteriorated or affected substances into the water of the suppression pool 6.

It is noted that the rotating brush 16 shown in FIG. 5 is merely one example. As long as a suction port is provided around the rotating brush main body 16a, the arrangement of the remaining constituent elements can be modified in a various manner.

The underwater inspection of the coating (coated) film on the inner surface of the suppression pool wall 6a (in the step S3) will be described hereunder.

In the underwater inspection, as stated above, the underwater light 18, the fixed camera 19, the first movable camera 20 and the second movable camera 21 shown in FIG. 3 are used.

The underwater light is provided on the front surface of the helmet 23 which the diver 22 wears, so that the light can lights the inspection portions (portions to be inspected).

The fixed camera 19 is swung by the remote control operation from the air part 25 side to catch the movement of the diver 22 in the suppression pool 6. An image (video) signal obtained by the fixed camera 19 is outputted to a TV monitor 26 provided in the air part 25, thereby allowing the operator to observe the inspection positions on the TV monitor 26 in the air part 25.

The first movable camera 20, which is provided on the front surface of the helmet 23 which the diver 22 wears, can display an image of a position approaching the inspection position at a certain distance. Since the first movable camera 20 is also connected to the TV monitor 27 provided in the air part 25, it is possible to obtain detailed positional information on the moving position of the diver 22 in the air part 25 and to observe the overall images of the coating film portion at the same moving position.

Moreover, the diver 22 operates the second movable camera 21 manually. The second movable camera 21 is used to observe the state of the coating film while approaching the inspection position more closely than the first movable camera 20. Since the second movable camera 21 is also connected to the TV monitor 28 provided in the air part 25, it is possible to observe the state of the coating film in the air part 25 in an extremely detailed manner.

As a result, the coated film can be accurately inspected in the unit of 0.5 mm according to the present embodiment. The deterioration of the coated film can be determined from the fact that rust or blister appears on the deteriorated part. The diver 22 applies a mark on the deteriorated part of the coated film. Thus, the diver 22 can specify the repair position to be repaired and easily confirm the position in a later repair coating step.

After specifying the repair position of the coated film on the inner surface of the suppression pool wall 6a in the above-stated inspection operation, the substrate treatment for the repair position is performed as the pre-treatment of underwater repair coating operation (step S4) for repairing that position.

The substrate treatment in the repair coating region is performed by using the disc sander 29 or grinder 30 shown in FIG. 3. The disc sander 29 or the grinder 30 uses a steel plate which is the base material of the coated surface of the suppression chamber 3 designed to be dedicated for a coated film removal purposes, and which is not cut, and only the coated film deteriorated or deformed at the repair coating position is peeled off by using the disc sander 29 or the grinder 30. The suction pump 17 is connected to the disc sander 29 and the grinder 30, and the floating substances and/or sludges and the surrounding water are sucked up by this suction pump 17, so that substrate treatment can be performed without diffusing the substances and sludges into the water.

Figure 6:
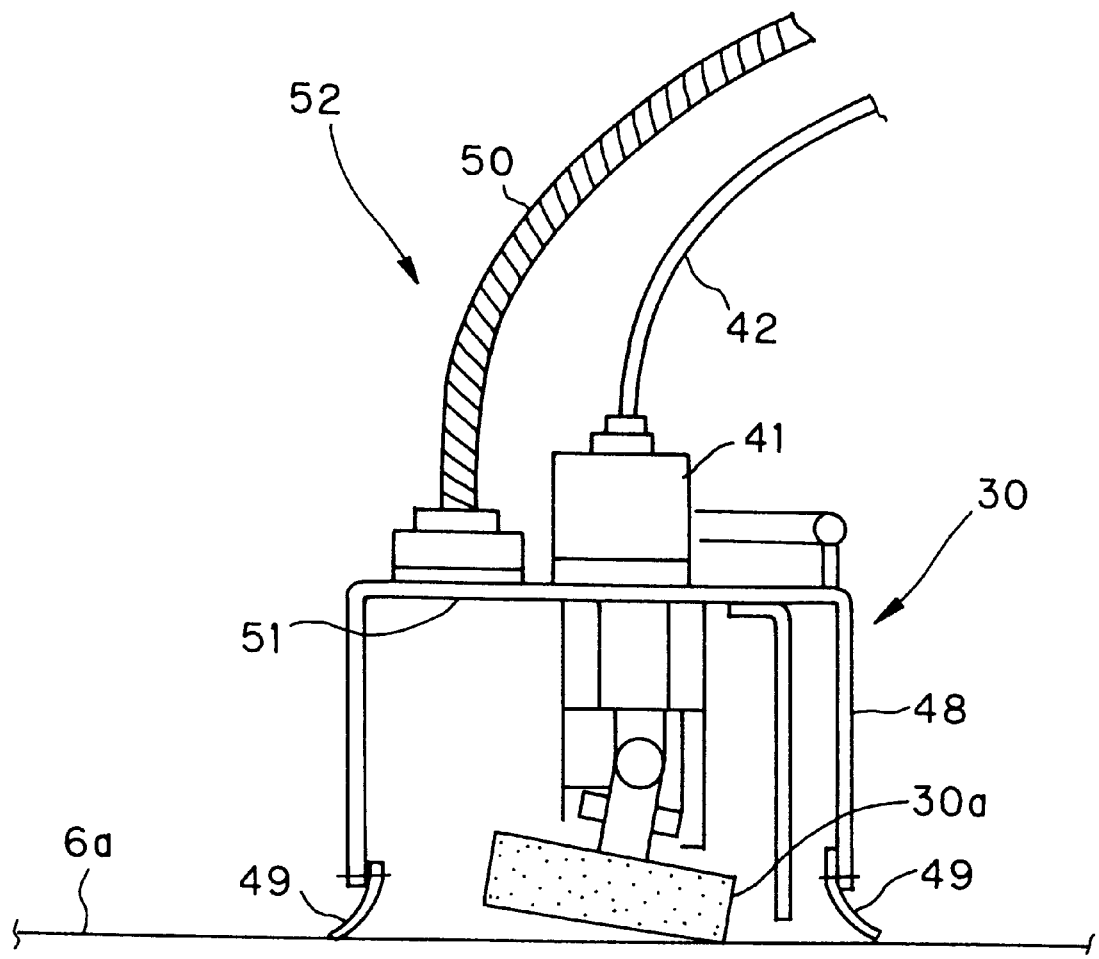
FIG. 6 is a sectional view showing a grinder in an enlarged scale usable for the present invention.

FIG. 6 is a cross-sectional view typically showing the grinder 30 in an enlarged scale. The grinder 30 includes a grinder main body 30a driven by an air motor 41. The grinder main body 30a is surrounded by a shield cover 48 and a shield brush 49. The air motor 41 is connected to the predetermined air system 32a shown in FIG. 3 through the air hose 42. If the air motor 41 is driven by air supplied from the predetermined air system 32a, the grinder main body 30a rotates. The rotation of the grinder main body 30a allows the deteriorated or deformed coated film degenerated to be peeled off.

The shield cover 48 is connected to the suction pump 17 shown in FIG. 3 through the vacuum hose 50 to suck up the water surrounding the grinder main body 30a from the suction port 51. That is, the shield cover 48, the shield brush 48, the vacuum hose 50 and the suction pump 17 serve as suction means 52 as a whole. Therefore, the deteriorated or deformed coated film which is peeled off through the rotation of the grinder main body 30a is diffused into the water once. However, the deteriorated or deformed coated film together with the surrounding water is sucked by the suction means 52. According to such manner, the substrate treatment for the repair position can be performed without diffusing the substances into the water of the suppression pool 6.

It is noted that the grinder 30 shown in FIG. 6 is merely one example. As long as a suction port is provided around the grinder main body 30a, the arrangement of the remaining constituent elements may be modified.

After the substrate treatment for the repair position is completed, the underwater coating operation which is the main operation for the repair coating is carried out.

Although a coating material used for the underwater coating is prepared by mixing a main agent and a curing agent, an underwater coating cannot be used in general in one or two hours after mixing, so that only the quantity which can be used up in one or two hours is mixed. The resultant coating material is applied onto the repair surface by using the brush 31 shown in FIG. 3. The brush 31 which is provided with a suction unit, though not shown, having a suction port similar to the grinder and the like mentioned above for sucking the surrounding water. The suction port is connected to the suction pump 17 which sucks up the coating material diffused around the repair surface together with surrounding water, so that the repair coating operation can be carried out without diffusing the coating material into the water. If the repair coating region is small, a finger portion of a glove of the diver 22, a knife or the like may be used for such coating operation. On the contrary, if the repair coating region is wide, a coating roller which is not shown may be used for this purpose.

Figure 7:
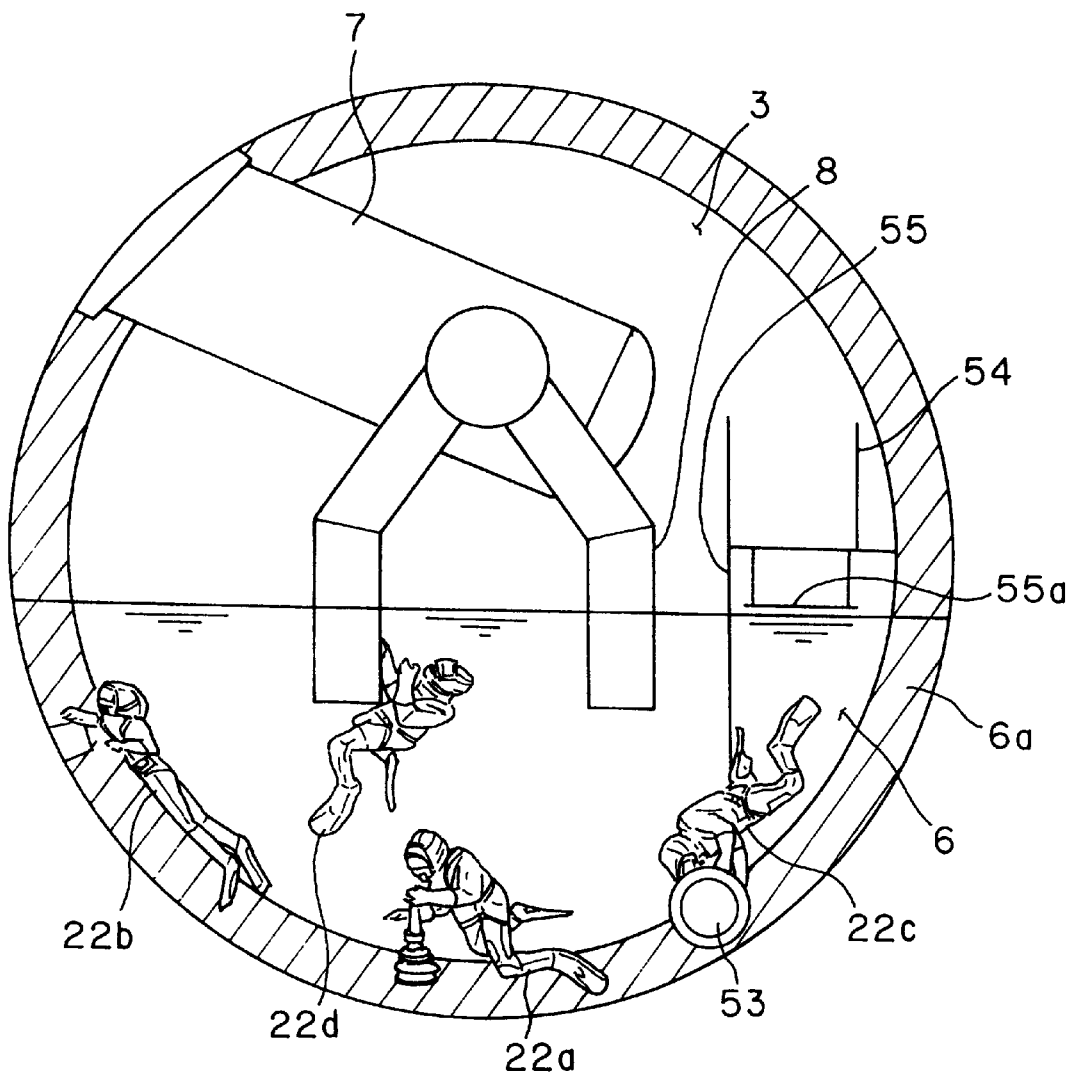
FIG. 7 is a view for explaining an underwater operation within a suppression chamber.

FIG. 7 is a view for explaining the operation state of the diver 22.

As shown in FIG. 7, a vent pipe 7 communicating with the dry well 2 is inserted into the suppression chamber 3. The vent pipe 7 is connected to the downcomer 8 which is opened to the water of the suppression pool 6 at the tip end portion thereof. A strainer 53 is disposed in the suppression pool 6. Further, a platform 54, a ladder 55 and a diving stage 55a are provided to the suppression chamber 3. The diver 22 dives into the suppression pool 6 from the diving stage 55a.

In the example of FIG. 7, a plurality of divers 22a, 22b, 22c and 22d dive into the suppression pool 6, in which, for example, the diver 22a engages decontamination of the inner surface of the suppression pool wall 6a and the diver 22b engages the repair coating for the coating film on the inner surface of the suppression wall 6a.

The diver 22c engages the closing of the strainer 53. The strainer closing operation is carried out for the inspection of the valve of a piping communicating with the outside of the pool 6 through the strainer 53 (so called, a valve in water). That is, the inspection of the valve, which is not shown, communicating with the strainer 53 can be carried out in a state in which the inflow of the water of the pool into the valve is stopped by, for example, putting a closing cover on the strainer 53 or providing a closing flange which is not shown. If the inspection of the valve is over, the closing flange is promptly detached to return the strainer 53 in operation. Thus, the inspection of the valve provided in the suppression pool 6 can be performed while the pool 6 is filled up with water.

Furthermore, the diver 22d engages the inspection of the thickness of the coating film on the inner surface of the suppression pool wall 6a or that of the steel plate of the suppression pool wall 6a. The thickness of the coated film can be measured in the water using a wet film thickness measuring device which is not shown. Likewise, the thickness of the steel plate of the suppression pool wall 6a can be measured in the water using an underwater plate thickness measuring device which is not shown. The inspection of the coating thickness or steel plate thickness facilitates the checking validity or the like.

Furthermore, the diver(s) 22 may perform a pad welding as repairing working to a portion of a steel plate extremely damaged in its soundness and weldings to inner structure of the suppression pool, ducts, equipments, duct supports and the like as repairing operation to defective portions or portions to be repaired. These workings are performed, after the inspection of the steel plate thickness of the suppression pool wall 6a, by using an underwater welding machine, not shown, in the underwater condition. The diver 22 may also perform the repairing working or operation for inspecting the quality of the welded portions mentioned above by using a non-destructive test apparatus in the underwater condition. Still furthermore, the diver 22 may perform a cutting working to the portions mentioned above in the underwater condition by using an underwater welding machine, not shown, as a repairing working.

Figure 8:
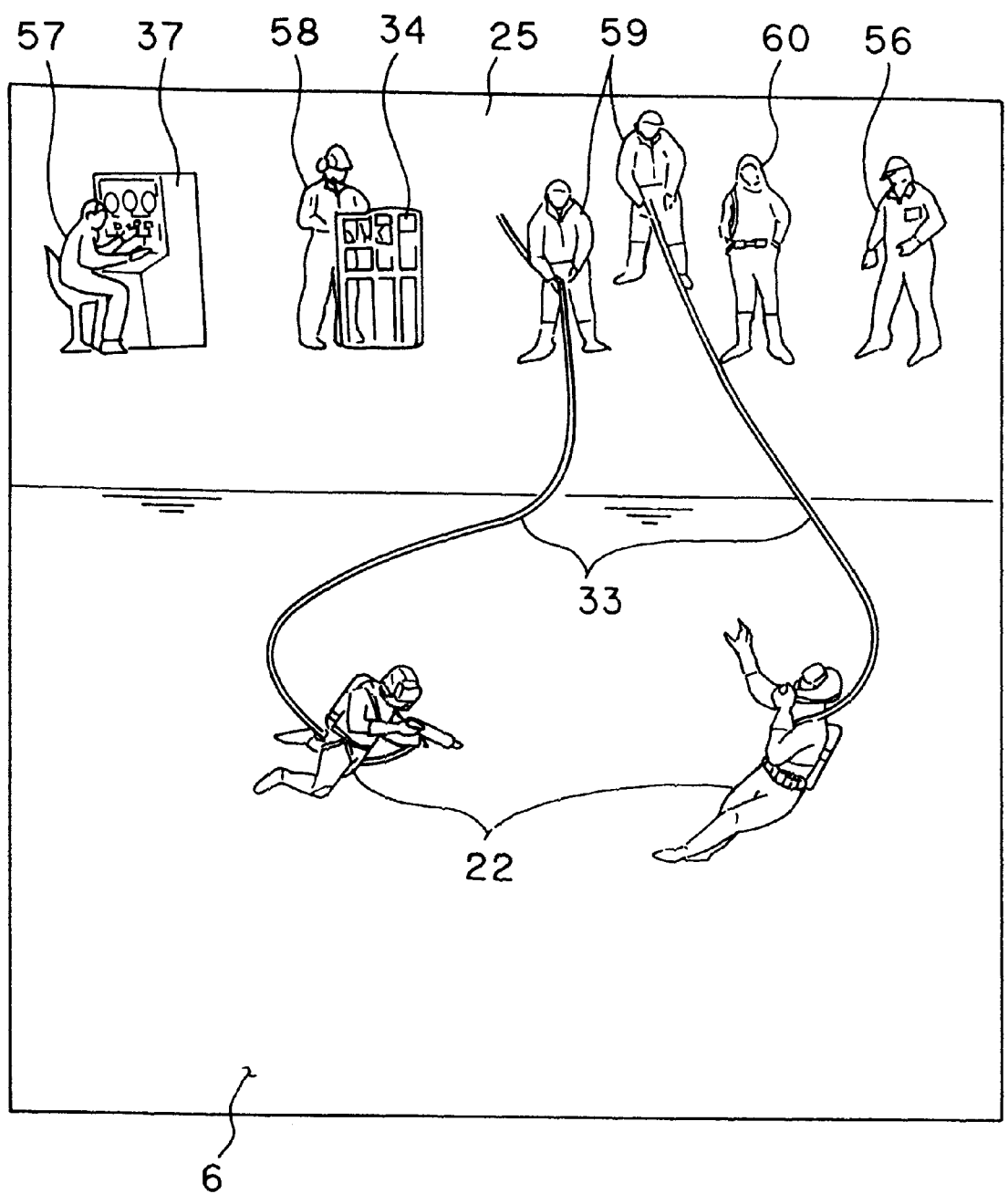
FIG. 8 is a view for explaining associated operations between an air part and the suppression pool side of the nuclear power plant of the present invention.

A series of maintenance operations stated above, as shown in FIG. 8, are desirably performed in cooperation with a plurality of divers 22 within the suppression pool 6, a diving operation supervisor 56 positioned in the air part 25, a control operator 57, an air feeding operator 58, a tender 59 and a stand-by diver 60. The diving operation supervisor 56, for instance, is a general representative for the diving operations and working and he plans and controls the diving schedule and diving operation. The control operator 57 engages the communication with the divers 22 through a communication system 37 and the recording of time. The air feeding operator 58 engages the management of the air feeding unit 34. The tender 59 supports the air hose 33 and observes the divers 22 in the suppression pool 6. The stand-by diver 60 rescues the diver(s) 22 in the suppression pool 6 in the event that any accident occurs to the diver(s) 22. In this way, the respective operators take their shares of responsibility and safe maintenance operations can be ensured.

After a series of maintenance operations are over, the divers 22 are desirably decontaminated in a shower equipment 61 provided in the suppression chamber as shown in FIG. 9 for preventing the divers 22 from being exposed to radioactivity in addition to the advantageous operations in the decontaminated water of the pool.

As stated above, according to this embodiment, it is possible to dispense with lots of workload, time, cost and the like which have been required for the conventional maintenance due to the need to drain off the pool and chamber, by carrying out the coating and other maintenance operations in the water of the suppression pool 6.

In this embodiment, although the method of the present invention is applied to the maintenance of the suppression pool 6, the maintenance method is also applicable to the spent fuel storage pool 10.

Although the above embodiment represents a case where a diver or divers carry out the operations, a diving robot equipped with the above-stated movable cameras, a mechanism hung from the upper portion of the pool or the like may perform the operations instead of the diver or divers.

As mentioned hereinbefore, the present invention has excellent advantage such that much workload, time, cost and the like which have been required for the conventional method due to the need to drain off the pool and chamber can be dispensed with and maintenance can be conducted with relatively simple operation for a short time and at low cost in a state in which the suppression pool and the spent fuel storage pool are filled up with water.

It is to be noted that the present invention is not limited to the described embodiment and many other changes or modifications may be made without departing from the scopes of the appended claims.

What is claimed is:

1. A maintenance method in a nuclear power plant including a reactor primary containment vessel provided with a suppression pool of a suppression chamber, comprising the steps of:
   improving clearness of a water in the suppression pool and decontaminating an interior of the suppression pool; and
   inspecting a coated film applied on an inner surface of a wall portion of the suppression pool, said improving, decontaminating and inspecting steps being performed while maintaining a water level in the suppression pool.

2. A maintenance method in a nuclear power plant according to claim 1, further comprising the step of carrying out a repair coating to the coated film through the underwater operation in the suppression pool after inspecting the coated film applied on the inner surface of the suppression pool wall.

3. A maintenance method in a nuclear power plant according to claim 1, further comprising the steps of preparing a film thickness measuring device into the suppression pool and measuring a thickness of the coated film on the inner surface of the suppression pool wall by using the film thickness measuring device.

4. A maintenance method in a nuclear power plant according to claim 1, further comprising the step of preparing an underwater plate thickness measuring device into the suppression pool and measuring a plate thickness of a plate constituting the suppression pool wall by using the plate thickness measuring device.

5. A maintenance method in a nuclear power plant according to claim 1, further comprising the step of closing a strainer provided on the inner surface of the suppression pool wall in an underwater operation and inspecting a valve of a piping communicating with the outside of the suppression pool through the strainer.

6. A maintenance method in a nuclear power plant according to claim 1, further comprising the step of welding defect portions and portions to be repaired of the suppression pool wall, inner structure of the suppression pool, ducts, machineries and duct supports in an underwater operation in the suppression pool.

7. A maintenance method in a nuclear power plant according to claim 1, further comprising the steps of welding defect portions and portions to be repaired of the suppression pool wall, inner structure of the suppression pool, ducts, machineries and duct supports in an underwater operation in the suppression pool and carrying out non-destructive test to said welded portions in an underwater operation in the suppression pool for quality inspection.

8. A maintenance method in a nuclear power plant according to claim 1, further comprising the step of carrying out a cutting working for repairing an inner structure of the suppression pool, ducts, machineries and duct supports in an underwater operation in the suppression pool.

9. A maintenance method in a nuclear power plant according to claim 1, wherein the clearness and the decontamination of the water in the suppression pool is performed by collecting substances floating in the water of the suppression pool and removing and collecting sludge substance deposited on an inner bottom surface of the suppression pool wall.

10. A maintenance method in a nuclear power plant according to claim 9, wherein the substance floating in the water of the suppression pool is sucked up together with the surrounding water out of the suppression pool by suction means movable in or above the water.

11. A maintenance method in a nuclear power plant according to claim 10, wherein the substances and the surrounding water sucked up in the suppression pool are subjected to solid-liquid separation on an outside the suppression pool.

12. A maintenance method in a nuclear power plant according to claim 9, wherein said suction means comprises a rotating brush and suction port arranged around the rotating brush so as to suck up the sludge substance on the inner bottom surface of the suppression pool together with the surrounding water therein.

13. A maintenance method in a nuclear power plant according to claim 1, wherein the decontamination of the interior of the suppression pool includes removing of sludges and deteriorated matters on the inner surface of the suppression pool wall.

14. A maintenance method in a nuclear power plant according to claim 13, wherein the sludges on the inner surface of the suppression pool wall are removed through a sucking step by using a suction means comprising a rotating brush and a suction port arranged around the rotating brush so as to suck up the sludges and deteriorated matters together with the surrounding water in the suppression pool.

15. A maintenance method in a nuclear power plant according to claim 14, wherein the sludges and the deteriorated matters sucked up with the surrounding water in the suppression pool are subjected to solid-liquid separation on an outside of the suppression pool.

16. A maintenance method in a nuclear power plant according to claim 1, wherein the inspecting step of the coated film applied on the inner surface of the suppression pool wall is performed by visually observing an surface condition of the coated film by using an underwater camera unit.

17. A maintenance method in a nuclear power plant according to claim 16, wherein the underwater camera unit includes at least one of a fixed camera disposed in the suppression chamber and a camera movable in the water of the suppression pool.

18. A maintenance method in a nuclear power plant according to claim 17, wherein the underwater camera unit includes a fixed camera disposed in the suppression chamber and a camera movable in the water of the suppression pool, said fixed camera being used to set a general inspection position in the suppression pool and said movable camera including a first movable camera used to set a fine position approaching the inspection point and a second movable camera used to observe a state of the coated film while approaching the inspection position more closely than the first movable camera.

19. A maintenance method in a nuclear power plant according to one of claim 17, wherein information obtained by the underwater camera unit is displayed on a monitor television disposed outside the suppression pool to thereby allow observation in the air.

20. A maintenance method in a nuclear power plant according to claim 1, further comprising the step of carrying out a repair coating to the coated film through the underwater operation in the suppression pool after inspecting the coated film applied on the inner surface of the suppression pool wall.

21. A maintenance method in a nuclear power plant according to claim 20, wherein said repair coating step to the coated film on the inner surface of the suppression pool wall is carried out by peeling off a deteriorated or deformed coated film at a portion to be repaired by using one of a disc sander and a grinder provided with a suction means and a substrate treatment is carried out by sucking up the surrounding water out of the suppression pool.

22. A maintenance method in a nuclear power plant according to claim 20, wherein said repair coating step of the coated film on the inner surface of the suppression pool wall is carried out by applying an underwater coating to the inner surface of the suppression pool wall by using one of a brush having suction means arranged around the brush, a roller and other coating means and a coating splashed during the underwater coating step is sucked up outside the suppression pool together with the surrounding water.

\* \* \* \* \*

(12) EX PARTE REEXAMINATION CERTIFICATE (6212th)
United States Patent
Naruse et al.

(10) Number: US 6,219,399 C1
(45) Certificate Issued: Apr. 29, 2008

(54) MAINTENANCE METHOD IN NUCLEAR POWER PLANT

(75) Inventors: Yoshihiro Naruse, Yokohama (JP); Shinichi Hoshino, Yokohama (JP)

(73) Assignees: Kabushiki Kaisha Toshiba, Saiwai-Ku, Kawasaki-Shi, Kanagawa-Ken (JP); Toshiba Engineering Corporation, Saiwai-Ku, Kawasaki-Shi, Kanagawa-Ken (JP)

Reexamination Request:
No. 90/006,147, Nov. 20, 2001

Reexamination Certificate for:
Patent No.: 6,219,399
Issued: Apr. 17, 2001
Appl. No.: 09/317,916
Filed: May 25, 1999

(51) Int. Cl.
G21D 1/02 (2006.01)
G21C 19/00 (2006.01)
G21C 13/087 (2006.01)
G21C 13/08 (2006.01)
G21C 19/32 (2006.01)
G21C 17/00 (2006.01)

(52) U.S. Cl. .................. 376/245; 376/249; 376/308; 376/313

(58) Field of Classification Search ............... None
See application file for complete search history.

(56) References Cited

U.S. PATENT DOCUMENTS

| | | | | |
|---|---|---|---|---|
| 4,047,390 A | * | 9/1977 | Boyce, II | 61/69 R |
| 4,649,609 A | * | 3/1987 | Allison et al. | 376/249 |
| 4,867,608 A | * | 9/1989 | Kinghorn | 405/188 |
| H1262 H | * | 12/1993 | Bacvinskas et al. | 376/252 |
| 5,341,678 A | * | 8/1994 | Kervinen | 73/150 R |
| 5,353,054 A | * | 10/1994 | Geiger | 348/81 |
| 5,802,126 A | * | 9/1998 | Matsumoto et al. | 376/249 |
| 5,815,544 A | * | 9/1998 | Lefter | 376/313 |

OTHER PUBLICATIONS

FitzPatrick, "Boiling Water Reactor", Operating Nuclear Power Reactors by Location or Name, http://www.nrc.gov/info–finder/reactor/fitz.html, accessed Aug. 9, 2005.*
Power Engineering, pp. 31–34, Stuart (II), Jul. 1983.*
EPRI–NP–7088s, pp. (1–3)–14–38), (Appendix I–V), by Jenco, Dec. 1990.*
Nuclear News, *PSE&O buys Surbot–T for surveillance, sampling*, Dec. 1988.
Stuart, C., Power Engineering, *Underwater coating inspections cut BWR maintenance costs*, Aug. 1987.
Nuclear Marketing Report, *Diving and Nuclear Maintenance*, vol. 13, No. 1, Jan. 1987.
New York State Contract Reporter, Jan. 29, 1996.
New York Power Authority, James A. Fitzpatrick Nuclear Power Plant Torus Inspection, Desludging and Coating Repair Services invitation to bid dated Jan. 29, 1996.
ARD Corporation, *Scavenger—The Answer to Difficult Sludge Removal*, Feb. 2, 1989.
KTA–Tator, Inc., *1998—Coating Inspection Instrumentation Catalog*, 1998.
American Welding Society, *Specificaton for Underwater Welding*, Aug. 1992.
Cygnus Multi–Echo Metal Thickness Gauges.
Manual of Coating Work, *Coating Work for Light–Water, Nuclear Power Plants*, 1979.
Steffen, Inc., Underwater Grinder. Apr. 16, 2001.
Alocit Group, *Using Alocit coatings underwater*.

* cited by examiner

*Primary Examiner*—Peter C. English

(57) ABSTRACT

A maintenance of a suppression pool or spent fuel storage pool in a reactor primary containment vessel of a nuclear power plant includes a cleaning step of a water in the suppression pool and a decontamination step of an interior of the suppression pool, and in the maintenance, the coated film applied on an inner surface of a wall portion of the suppression pool is inspected. These cleaning, decontaminating and inspecting steps are performed by divers while maintaining a water level in the suppression pool.

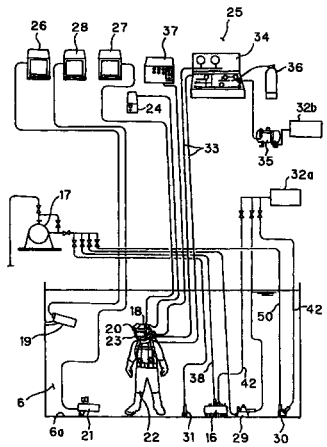

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 9–11 are determined to be patentable as amended.

Claims 2–8 and 12–22, dependent on an amended claim, are determined to be patentable.

1. A maintenance method in a nuclear power plant including a reactor primary containment vessel provided with [a suppression pool of] a suppression chamber *having a suppression pool of contaminated water at a first predetermined degree of clearness*, comprising the steps of:

improving *the* clearness of [a] *the* water in the suppression pool [and] *to a second predetermined degree of clearness by removing floating substances, together with water surrounding the floating substances, from the suppression pool while maintaining a water level in the suppression pool;*

*starting an execution of an underwater operation of a diver after the water in the suppression pool has reached the second predetermined degree of clearness;* decontaminating an interior of the suppression pool *during the underwater operation by removing at least one deposited substance, together with water surrounding the deposited substance, from the suppression pool to prevent the deposited substance from diffusing into the suppression pool and lowering the second predetermined degree of clearness of the contaminated water in the suppression pool and while maintaining a water level in the suppression pool;* and inspecting a coated film applied on an inner surface of a wall portion of the suppression pool [, said improving, decontaminating and inspecting steps being performed] *during the underwater operation and* while maintaining a water level in the suppression pool.

9. A maintenance method in a nuclear power plant according to claim 1, wherein the *step of improving the* clearness [and the decontamination] of the water in the suppression pool is performed by collecting substances floating in the water of the suppression pool and *decontaminating an interior of the suppression pool is performed by* removing and collecting *a* sludge substance deposited on an inner bottom surface of the suppression pool wall.

10. A maintenance method in a nuclear power plant according to claim 9, wherein the [substance] *substances* floating in the water of the suppression pool [is] *are* sucked up together with the surrounding water out of the suppression pool by suction means movable in or above the water.

11. A maintenance method in a nuclear power plant according to claim 10, wherein the substances and the surrounding water sucked up in suppression pool are subjected to solid-liquid separation on an outside *of* the suppression pool.

\* \* \* \* \*